(12) United States Patent
Kim et al.

(10) Patent No.: US 11,945,307 B2
(45) Date of Patent: Apr. 2, 2024

(54) INTEGRATED CONTROL APPARATUS FOR AUTONOMOUS VEHICLE

(71) Applicants: HYUNDAI MOTOR COMPANY, Seoul (KR); KIA CORPORATION, Seoul (KR); SL Corporation, Daegu (KR)

(72) Inventors: Eun Sik Kim, Gwangmyeong-si (KR); Seok Woo Ye, Daegu (KR); Jae Hoon Jung, Gyeongsan-si (KR); Ji Hoon Yang, Gyeongsan-si (KR)

(73) Assignees: Hyundai Motor Company, Seoul (KR); Kia Corporation, Seoul (KR); SL Corporation, Daegu (KR)

( * ) Notice: Subject to any disclaimer, the term of this patent is extended or adjusted under 35 U.S.C. 154(b) by 425 days.

(21) Appl. No.: 17/409,272

(22) Filed: Aug. 23, 2021

(65) Prior Publication Data

US 2022/0137617 A1    May 5, 2022

(30) Foreign Application Priority Data

Nov. 4, 2020    (KR) .......................... 10-2020-0146024

(51) Int. Cl.
*B60K 35/00*    (2006.01)

(52) U.S. Cl.
CPC ........ *B60K 35/00* (2013.01); *B60K 2370/115* (2019.05); *B60K 2370/1438* (2019.05); *B60K 2370/172* (2019.05); *B60K 2370/178* (2019.05); *G05D 2201/0212* (2013.01)

(58) Field of Classification Search
CPC ...... G05D 2201/0212; B60K 2370/175; B60K 35/00; B60K 2370/55; B60K 37/06; B60K 26/02; B60K 2026/029; F16H 59/0278; B60Q 1/0076; B60T 7/10; B62D 1/12

See application file for complete search history.

(56) References Cited

U.S. PATENT DOCUMENTS

| | | | |
|---|---|---|---|
| 2015/0338849 A1* | 11/2015 | Nemec ................. | G05D 1/0055 |
| | | | 701/25 |
| 2017/0015322 A1* | 1/2017 | Saito ..................... | G05D 1/0061 |
| 2018/0259058 A1* | 9/2018 | Meyer ................... | F16H 61/688 |
| 2019/0011916 A1* | 1/2019 | Alvarez Rodriguez ..................... |
| | | | G05D 1/0094 |
| 2019/0039425 A1* | 2/2019 | Dodd .................... | B60W 30/06 |
| 2021/0213829 A1* | 7/2021 | Choi ...................... | B62D 1/12 |

(Continued)

FOREIGN PATENT DOCUMENTS

| | | | | | |
|---|---|---|---|---|---|
| CN | 107914709 A | * | 4/2018 | ............ | B60K 35/00 |
| CN | 114084166 A | * | 2/2022 | ............ | B60W 50/14 |

(Continued)

*Primary Examiner* — Karen Beck
(74) *Attorney, Agent, or Firm* — Fox Rothschild LLP (57) ABSTRACT

An integrated control apparatus for an autonomous vehicle includes: a movable control device corresponding to a portable device that performs steering, gear-shifting, acceleration, and braking of a vehicle by a user's control when a driving mode is shifted from an autonomous driving mode to a manual driving mode; and a fixed display device controlled in a touch manner to perform other functions other than steering, gear-shifting, acceleration, and braking, wherein a steering dial switch, a gear-shifting slide switch, an acceleration rotary switch, and a brake button switch are disposed in the movable control device and are manipulated differently.

20 Claims, 11 Drawing Sheets

(56) References Cited

U.S. PATENT DOCUMENTS

2022/0057792 A1\* 2/2022 Kim .................. B60W 60/0053
2022/0305908 A1\* 9/2022 Jeong ..................... B60T 7/102

FOREIGN PATENT DOCUMENTS

| CN | 115285100 A | \* | 11/2022 | |
|----|----|----|----|----|
| DE | 102018105154 A1 | \* | 9/2018 | ............... B60K 6/36 |
| DE | 102019120121 A1 | \* | 10/2020 | ............. B60K 20/02 |
| DE | 102021200288 A1 | \* | 2/2022 | ........ B60W 50/0205 |
| JP | 2006155228 A | \* | 6/2006 | |
| KR | 10-1166895 B1 | | 7/2012 | |
| WO | WO-2007034567 A1 | \* | 3/2007 | ............... B62D 1/02 |

\* cited by examiner

INTEGRATED CONTROL APPARATUS FOR AUTONOMOUS VEHICLE

CROSS-REFERENCE TO RELATED APPLICATION

The present application claims priority to and the benefit of Korean Patent Application No. 10-2020-0146024, filed Nov. 4, 2020, the entire contents of which is incorporated herein for all purposes by this reference.

TECHNICAL FIELD

The present disclosure relates to an integrated control apparatus for an autonomous vehicle.

BACKGROUND

An autonomous vehicle refers to a smart vehicle employing on an autonomous driving technology, which can reach the destination autonomously without manual operation of the steering wheel, the acceleration pedal, and the brake by the driver.

If an autonomous driving situation is implemented universally, the driver may select between a manual driving mode in which the driver drives the car and an autonomous driving mode in which the vehicle can reach the destination autonomously without the user's manipulation.

Meanwhile, if an emergency occurs during an autonomous travel, one of the passengers must manually operate the vehicle. To this end, the vehicle needs to be provided with a device to be manipulated by the user in the manual driving mode.

For example, the vehicle manager may manipulate the vehicle in the manual driving mode by using a device such as a joystick, which is used in connection with a game console or the like. Since multiple buttons, levers, and toggle-based switches are arranged on a single joystick in a complicated manner, manipulation thereof may be difficult and inconvenient, and, in particular, there is a possibility that erroneous operations will occur.

The above descriptions regarding background arts are only for helping understanding of the background of the present disclosure, and are not to be considered by a person skilled in the art as corresponding to already-known prior arts.

SUMMARY

It is an aspect of the present disclosure to provide an integrated control apparatus installed in an autonomous vehicle such that the user can control the same when the driving mode is switched from an autonomous driving mode to a manual driving mode. The integrated control apparatus includes a movable control device for steering, gear-shifting, acceleration, and braking, and a fixed display device manipulated in a touch type to manipulate other functions. As a result, manipulation convenience is improved, and erroneous operations can be prevented to the largest extent.

In accordance with an aspect of the present disclosure, an integrated control apparatus disposed in an autonomous vehicle such that a user can manipulate the integrated control apparatus when a driving mode is shifted from an autonomous driving mode to a manual driving mode, the integrated control apparatus including a movable control device that the user holds and manipulates, with the user's hand, for steering, gear-shifting, acceleration, and braking.

The movable control device may include: a housing held by one hand of the user; and a steering dial switch, a gear-shifting slide switch, an acceleration rotary switch, and a brake button switch which are disposed in the housing.

The integrated control apparatus for an autonomous vehicle may further include a fixed display device configured to be separated from the movable control device and be manipulated by the user in a touch manner so as to enable control of functions other than steering, gear-shifting, acceleration, and braking.

The movable control device may be a portable device that the user can hold and move to a desired position, and the fixed display device may be a device fixedly installed in an indoor space of the autonomous vehicle.

Other functions implemented by control of the fixed display device may include a function of driving lamps mounted on front and rear sides of a vehicle, a function of making a warning sound, and a function of switching a driving mode.

The movable control device may be connected to the autonomous vehicle by the medium of a spring wire, and opposite ends of the spring wire may be connected to the movable control device and the autonomous vehicle in a separable connector structure.

The housing may include: a holding part held by one hand of the user; and a switch part extending along a longitudinal direction of the holding part, and including the steering dial switch, the gear-shifting slide switch, the acceleration rotary switch, and the brake button switch.

When the user is holding the holding part with one hand of the user, the steering dial switch may be disposed on an upper end of a rear surface of the housing and may be turned clockwise or counterclockwise by the other hand of the user, which does not hold the holding part, to be manipulated.

The steering dial switch may be turned clockwise or counterclockwise with respect to the housing by manipulation of the user, and, when a manipulating force of the user is released, may be turned in an opposite direction by means of a spring force of a return spring so as to return to an initial position.

The steering dial switch may include a damper configured to slow a speed of restoration due to the spring force of the return spring, and the damper may be concentrically installed inside the steering dial switch.

The gear-shifting slide switch may be disposed on an upper surface of the switch part, and the user may manipulate the gear-shifting slide switch by placing a finger of the user's other hand, which does not hold the holding part, in contact with a surface of the gear-shifting slide switch, and pushing forwards or pulling backwards the finger.

When the gear-shifting slide switch is manipulated, one of four shifting gears (P gear, R gear, N gear, and D gear) may be executed, or one of three shifting gears (R gear, N gear, and D gear) may be executed.

If one of the three shifting gears (R gear, N gear, and D gear) is configured to be executed when the gear-shifting slide switch is manipulated, a menu for shifting to the P gear may be configured on the fixed display device.

If one of the three shifting gears (R gear, N gear, and D gear) is configured to be executed when the gear-shifting slide switch is manipulated, the gear-shifting slide switch may be shifted to an N gear and then the brake button switch may be manipulated for a predetermined time or longer so that the P gear is executed.

The acceleration rotary switch may be disposed at a position closest to the holding part in the switch part, and the user may manipulate the acceleration rotary switch by inserting a finger of the user's hand holding the holding part, into a hole of the housing in a leftward/rightward direction, and then pulling the finger backwards.

In order to provide a feeling of manipulation and a restorative force of the acceleration rotary switch, a bullet may be installed in the acceleration rotary switch to be elastically supported by the medium of a bullet spring, and a groove member may be fixedly installed in the housing, the groove member including a wavy groove which is formed thereon and is in contact with the bullet.

When the user is holding the holding part with one hand of the user, the brake button switch may be disposed on a rear surface of the housing, and the user may manipulate the brake button switch by pressing the brake button switch with a finger of the user's hand holding the holding part.

The acceleration rotary switch and the brake button switch may be installed to be connected to each other by means of a connection spring, the connection spring may provide the acceleration rotary switch and the brake button switch with a restorative force, and if the user simultaneously manipulates the acceleration rotary switch and the brake button switch, the user can recognize, through a spring force of the connection spring, a situation in which the two switches are simultaneously manipulated.

The movable control device may further include: permanent magnets coupled to the steering dial switch, the gear-shifting slide switch, the acceleration rotary switch, and the brake button switch, respectively; and a PCB fixedly installed in the housing while facing the permanent magnets. The PCB may generate one signal among a signal related to steering, a signal related to gear-shifting, a signal related to acceleration, and a signal related to braking, through a change in magnetic flux of the permanent magnets.

If the acceleration rotary switch and the brake button switch are simultaneously manipulated, the PCB may recognize and process a signal of the brake button switch as a priority.

In order to prevent erroneous manipulations, the steering dial switch, the gear-shifting slide switch, the acceleration rotary switch, and the brake button switch may be manipulated in different types.

An integrated control apparatus for an autonomous vehicle according to the present disclosure is configured as follows: when the driving mode is switched from an autonomous driving mode to a manual driving mode, the user manipulates a movable control device corresponding to a portable device to perform steering, gear-shifting, acceleration, and braking of a/the vehicle, and manipulates a touch-type fixed display device to perform other functions of the vehicle. This configuration is advantageous in that manipulation is easy and convenient. In particular, various vehicle control functions are separately assigned to the movable control device and the touch-type fixed display device, thereby preventing erroneous manipulations to the largest extent.

In addition, the movable control device is a portable device which can be held by the user's hand to be moved to a desired position, and is advantageous in that the device can be easily manipulated due to its small volume and light weight.

In addition, the steering dial switch, the gear-shifting slide switch, the acceleration rotary switch, and the brake button switch, which are provided in the movable control device, are configured to be manipulated in different types, thereby preventing erroneous manipulations to the largest extent.

DRAWINGS

The above and other aspects, features and advantages of the present disclosure will be more apparent from the following detailed description taken in conjunction with the accompanying drawings, in which.

DETAILED DESCRIPTION

A specific structural or functional description of embodiments of the present disclosure disclosed in the specification or application is given merely for the purpose of describing the embodiment according to the present disclosure. Therefore, the embodiments according to the present disclosure may be implemented in various forms, and the present disclosure should not be construed as being limited to the embodiments described in the specification or application.

Various changes and modifications may be made to the embodiments according to the present disclosure, and therefore particular embodiments will be illustrated in the drawings and described in the specification or application. However, it should be understood that embodiments according to the concept of the present disclosure are not limited to the particular disclosed embodiments, but the present disclosure includes all modifications, equivalents, and alternatives falling within the spirit and scope of the present disclosure.

Such terms as "a first" and/or "a second" may be used to described various elements, but the elements should not be limited by these terms. These terms are intended merely to distinguish one element from other elements. For example, a first element may be named a second element and similarly a second element may be named a second element without departing from the scope of protection of the present disclosure.

In the case where an element is referred to as being "connected" or "accessed" to other elements, it should be understood that not only the element is directly connected or accessed to the other elements, but also another element may exist between them. Contrarily, in the case where a component is referred to as being "directly connected" or "directly accessed" to any other component, it should be understood that there is no component therebetween. The other expressions of describing a relation between structural elements, i.e. "between" and "merely between" or "neighboring" and "directly neighboring", should be interpreted similarly to the above description.

The terms used herein are merely used to describe specific embodiments, and are not intended to limit the present disclosure. A singular expression may include a plural expression unless they are definitely different in a context. As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined herein.

A control unit (controller) according to exemplary embodiments of the present disclosure may be implemented by a non-volatile memory (not shown) which is configured to store data pertaining to an algorithm configured to control operations of various vehicle components or software instructions for reproducing the algorithm, and a processor (not shown) which is configured to perform the operations as described below by using the data stored in the corresponding memory. Here, the memory and the processor may be implemented as individual chips. Alternatively, the memory and the processor may be implemented as an integrated single chip. The processor may be in the form of one or more processors.

Hereinafter, description of an integrated control apparatus for an autonomous vehicle according to an exemplary embodiment of the present disclosure will be given with reference to attached drawings.

As illustrated in FIGS. 1 to 11, an integrated control apparatus for an autonomous vehicle in some forms of the present disclosure is an apparatus which is installed in an autonomous vehicle 1 and enables an operator of the vehicle to manually control and drive the vehicle in a manual driving mode when an emergency situation occurs during autonomous driving.

Figure 1:
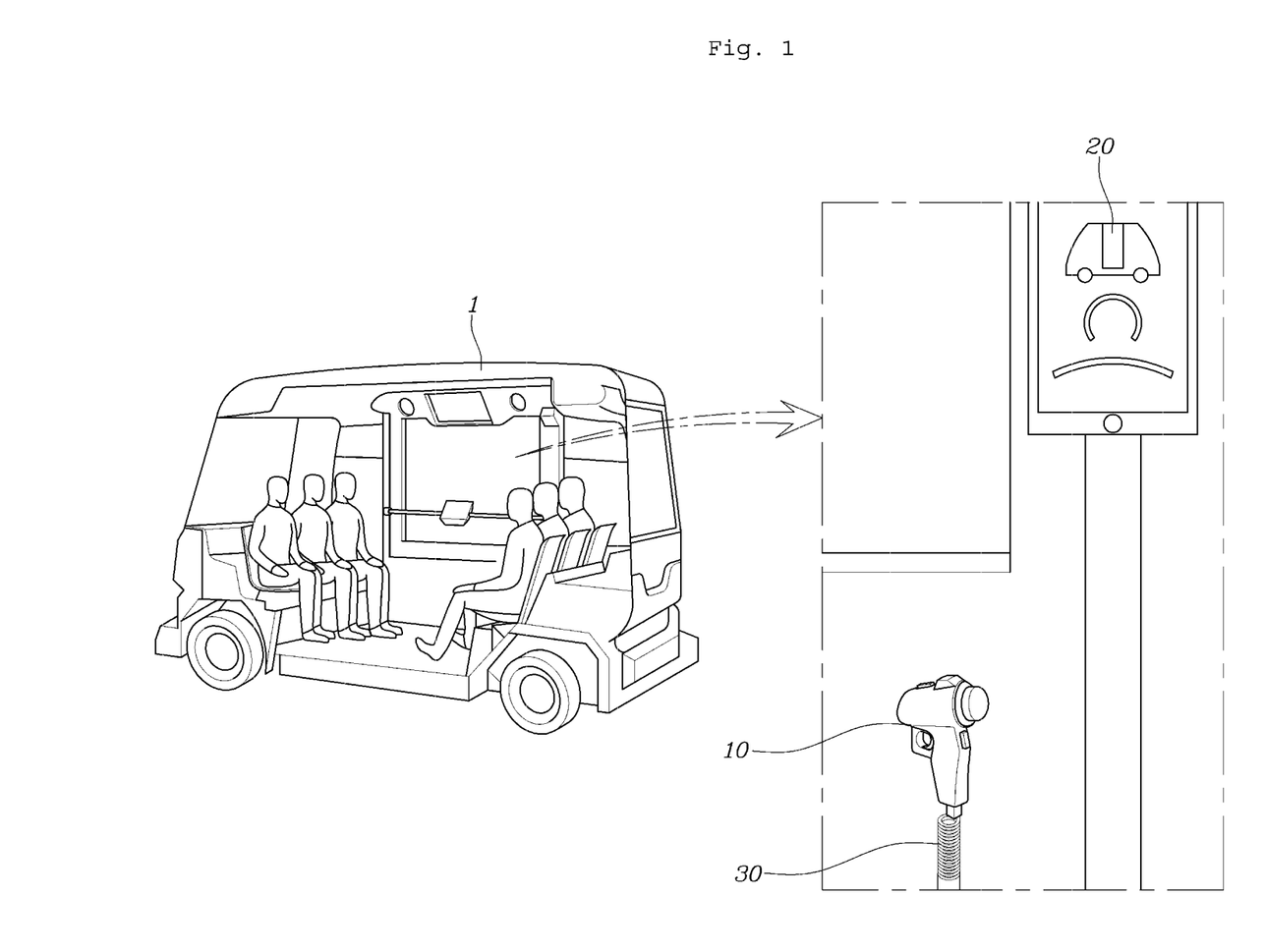
FIG. 1 illustrates an integrated control apparatus disposed in an autonomous vehicle in one form of the present disclosure.

That is, an integrated control apparatus for an autonomous vehicle according to the present disclosure includes: a movable control device 10 manipulated by a user for steering, gear-shifting, acceleration, and braking while being held by a hand 2 of the user; and a fixed display device 20 configured to be separated from the movable control device 10 and manipulated by the user in a touch manner for control of other functions other than steering, gear-shifting, acceleration, and braking.

The movable control device 10 is a portable control device which can be held by the hand 2 of the user to be moved to a desired position, the fixed display device 20 is a device fixedly installed in an indoor space of the autonomous vehicle 1, and the movable control device 10 and the fixed display device 20 are thus structurally separated from each other.

In accordance with an outward appearance, the movable control device 10 may be referred to as a lever-type control device.

Other functions implemented by manipulation of the fixed display device 20 include a function of driving lamps mounted on front and rear sides of a vehicle, a function of making a warning sound, and a function of switching a driving mode.

The lamps of the vehicle include all kinds of lamps mounted on the vehicle, and may include head lamps, fog lamps, turn signal lamps, tail lights, warning lights, and the like.

A driving mode to be switched includes an autonomous driving mode and a manual driving mode.

According to an embodiment of the present disclosure, a movable control device 10 (corresponding to a portable device) is manipulated to perform steering, gear-shifting, acceleration, and braking of a/the vehicle, and a touch-type fixed display device 20 is manipulated to perform other functions of the vehicle. This configuration is advantageous in that manipulation is easy and convenient. In particular, various vehicle control functions are separately assigned to the movable control device 10 and the touch-type fixed display device 20, thereby preventing erroneous manipulations to the largest extent.

In addition, the movable control device 10 is a portable device which can be held by a user's hand to be moved to a desired position, and is advantageous in that the device can be easily manipulated due to its small volume and light weight.

Figure 2:
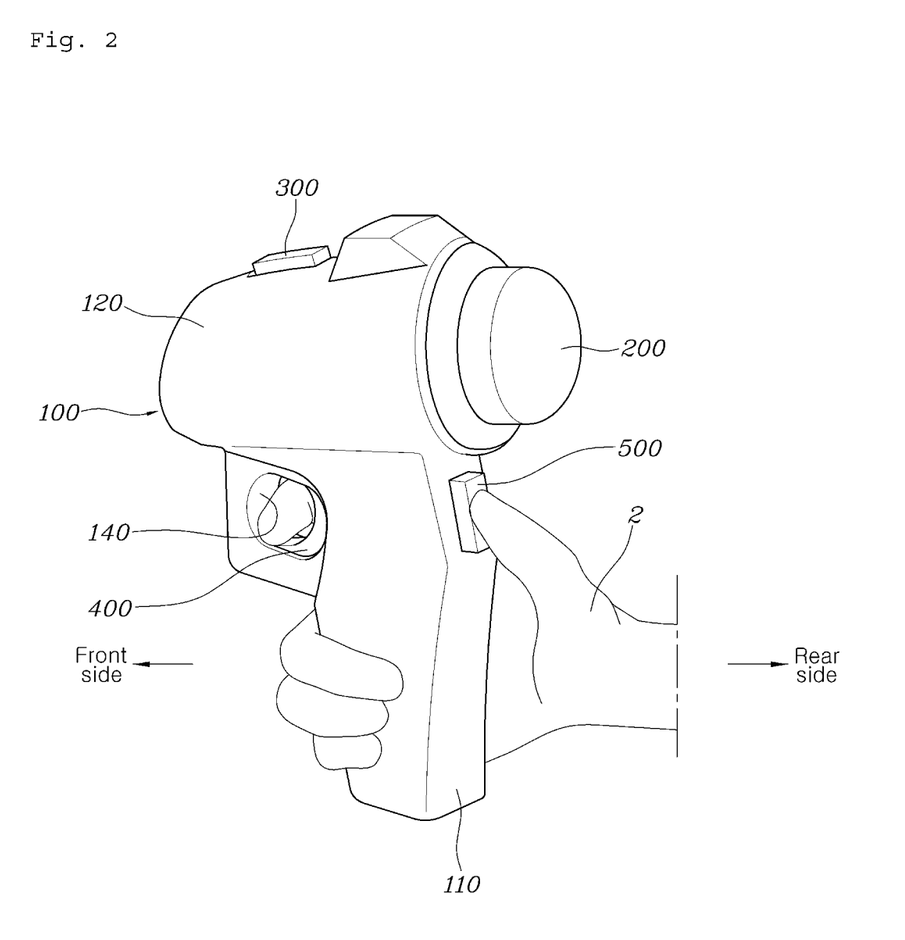
FIG. 2 is a perspective view of a movable control device in one form of the present disclosure.
Figure 3:
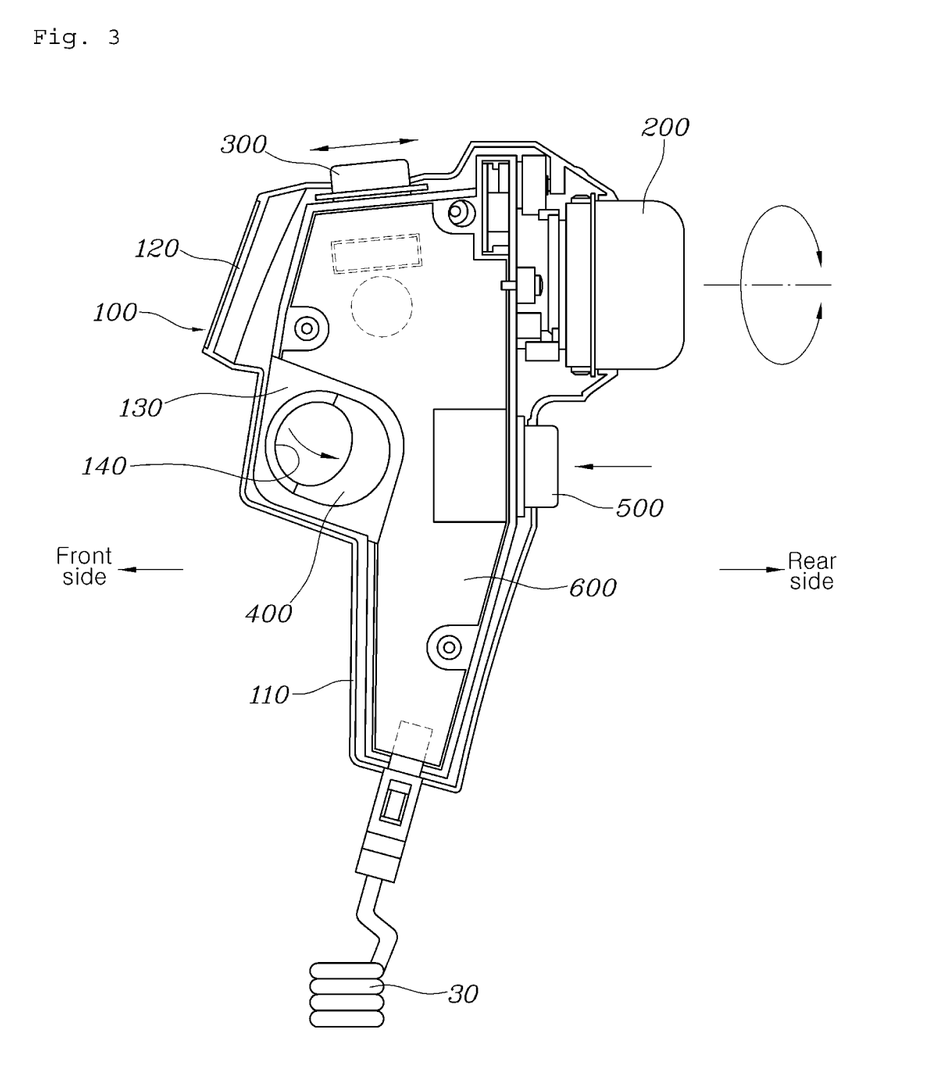
FIG. 3 and FIG. 4 are side views of the movable control device illustrated in FIG. 2, with one side surface of the housing thereof removed.
Figure 4:
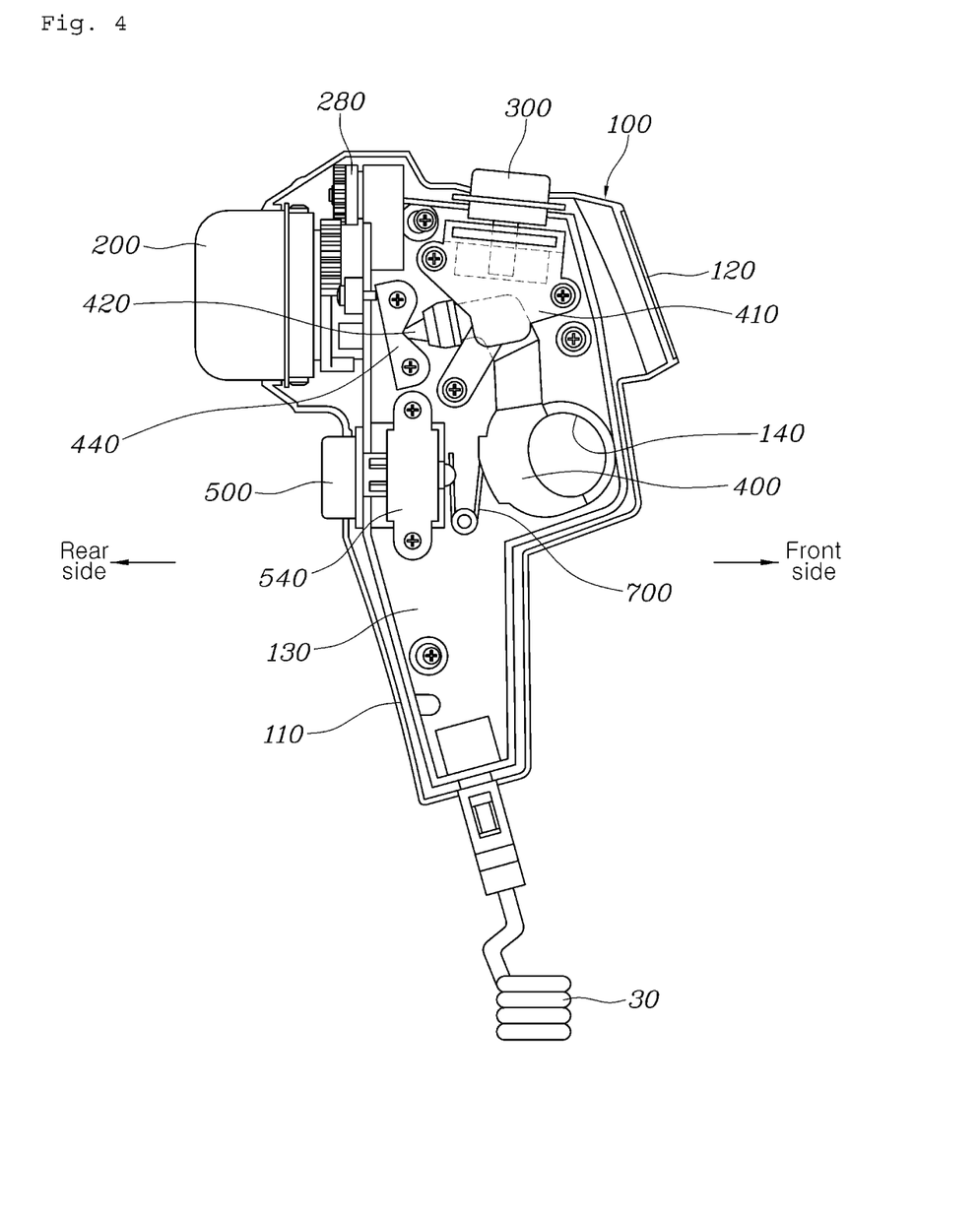

The movable control device 10 according to the present disclosure includes: a housing 100 to be held by the one hand 2 of the user; and a steering dial switch 200, a gear-shifting slide switch 300, an acceleration rotary switch 400, and a brake button switch 500 which are disposed in the housing 100.

The housing 100 is formed to have a straight box structure and includes: a holding part 110 to be held by the one hand 2 of the user; and a switch part (120) extending along a longitudinal direction of the holding part 110 and including the steering dial switch 200, the gear-shifting slide switch 300, the acceleration rotary switch 400, and the brake button switch 500.

Figure 5:
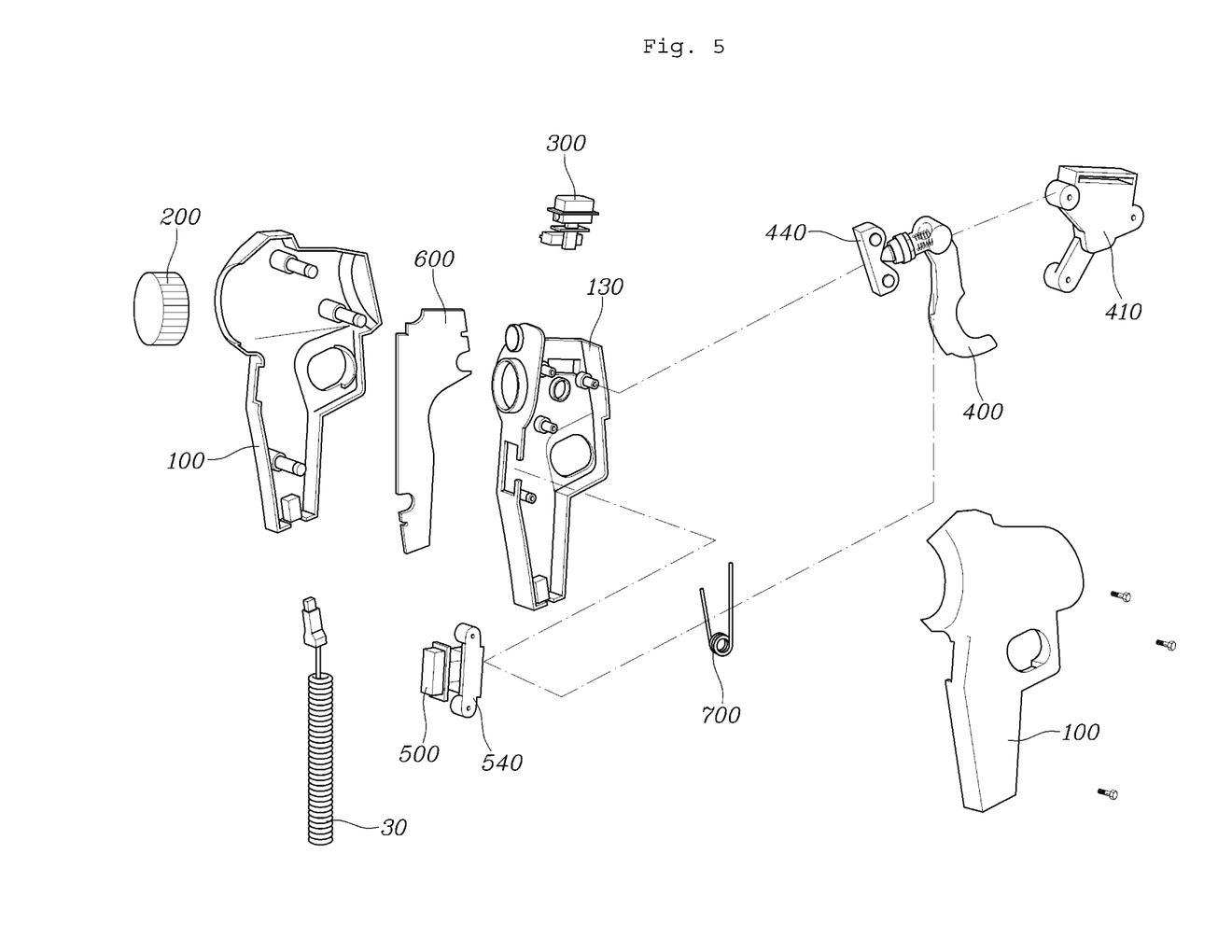
FIG. 5 is an exploded perspective view of the movable control device in one form of the present disclosure, illustrated in FIG. 3.

The housing 100 serves to form an outward appearance and protect internal components in case of impact, is configured by coupling of a left housing and a right housing which are configured to be separable from each other, and includes a core bracket 130 disposed therein.

The core bracket 130 includes multiple functional components coupled thereto, and serves to restrain a printed circuit board (PCB) to be described later.

A configuration including the left housing, the right housing, and the core bracket 130 may indicate the housing 100.

The movable control device 10 is connected to the autonomous vehicle through the medium of a spring wire 30, and opposite ends of the spring wire 30 are connected to the movable control device 10 and the autonomous vehicle in a separable connector structure.

The movable control device 10 is a portable control device which can be held by the hand 2 of the user who is an operator of the vehicle, so as to be moved to a desired position, and the spring wire 30 does not cause a sagging phenomenon by means of its own tension even when the movable control device 10 is moved, so as to be prevented from being stepped on by a foot, thereby having an advantage in terms of safety by preventing failure due to disconnection thereof.

Since the connector structure of the spring wire 30 has a locking structure, the spring wire is not separated from the movable control device 10 and a body of the autonomous vehicle unless the locking is released.

When the user is holding the holding part 110 with the one hand 2 thereof, the steering dial switch 200 is disposed on an upper end of a rear surface of the housing 100, and the user manipulates the steering dial switch by turning the same clockwise or counterclockwise with the other hand which does not hold the holding part 110.

As shown in FIG. 2, when the user encloses the right hand around and holds the holding part 110, and the switch part 120 extends above the holding part 110, the steering dial switch 200 protrudes from the top of a rear surface of the switch part 120 toward the user's body and is disposed to be rotatable in a dial manner, and the user can manipulate the steering dial switch by turning the same clockwise or counterclockwise with the other hand which does not hold the housing 100, namely the user's left hand or a finger of the user's left hand.

The steering dial switch 200 is turned clockwise or counterclockwise with respect to the housing 100 by the user's manipulation, and, when the user's manipulating force is released, is turned in an opposite direction by a spring force of a return spring 240, so as to return to its initial position.

In addition, the steering dial switch 200 includes a damper 260 for slowing a speed of restoration due to the spring force of the return spring 240, the damper 260 is concentrically installed inside the steering dial switch 200, and the damper 260 is installed to be positioned inside the steering dial switch 200, so that the steering dial switch 200 can have a reduced external size, thereby having a compact configuration.

The steering dial switch 200 is installed to be exposed to the outside of the housing 100 through the rear surface of the top of the switch part 120, the rear surface facing the user.

Figure 6:
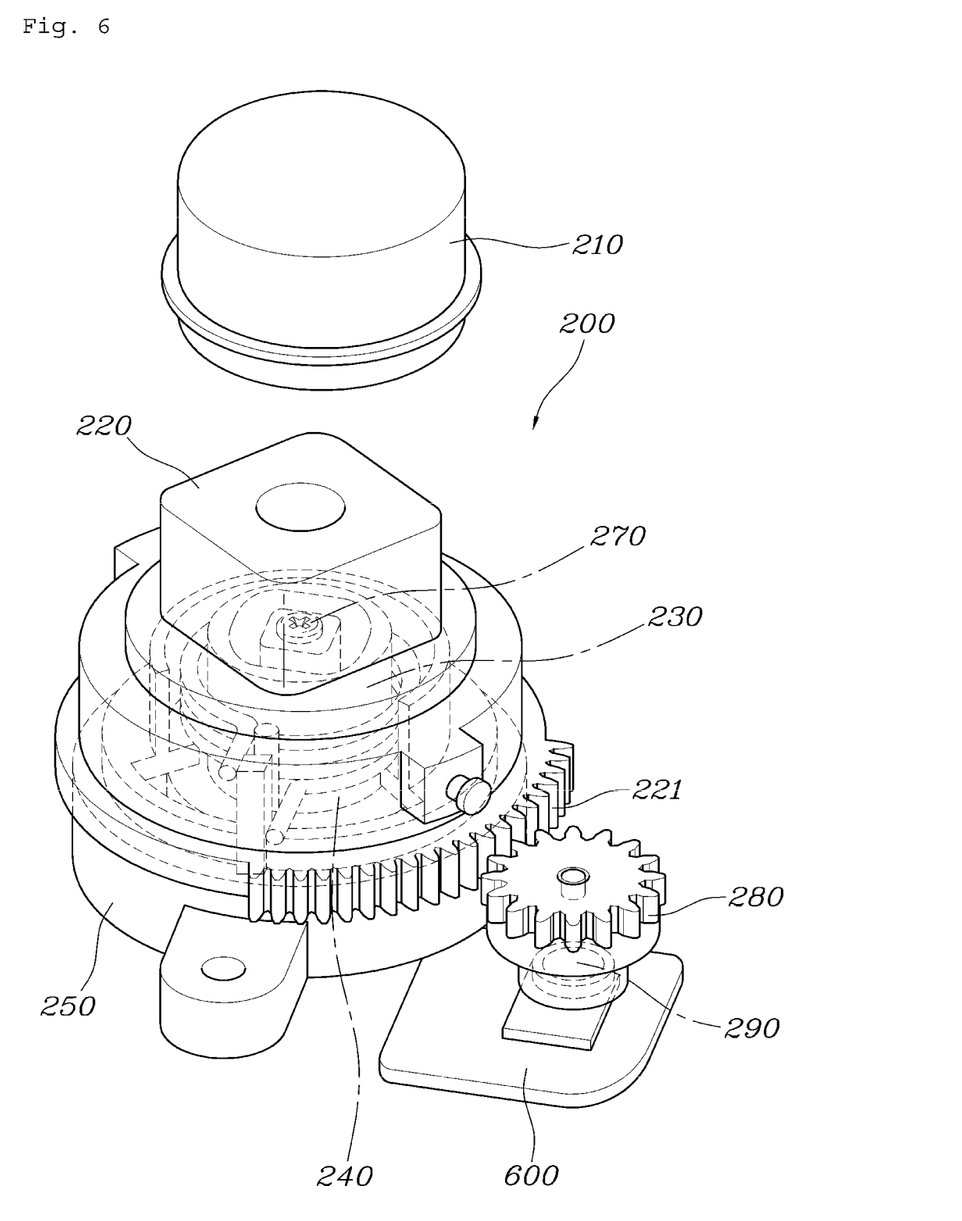
FIG. 6 to FIG. 8 are drawings for describing a steering dial switch in one form of the present disclosure.
Figure 7:
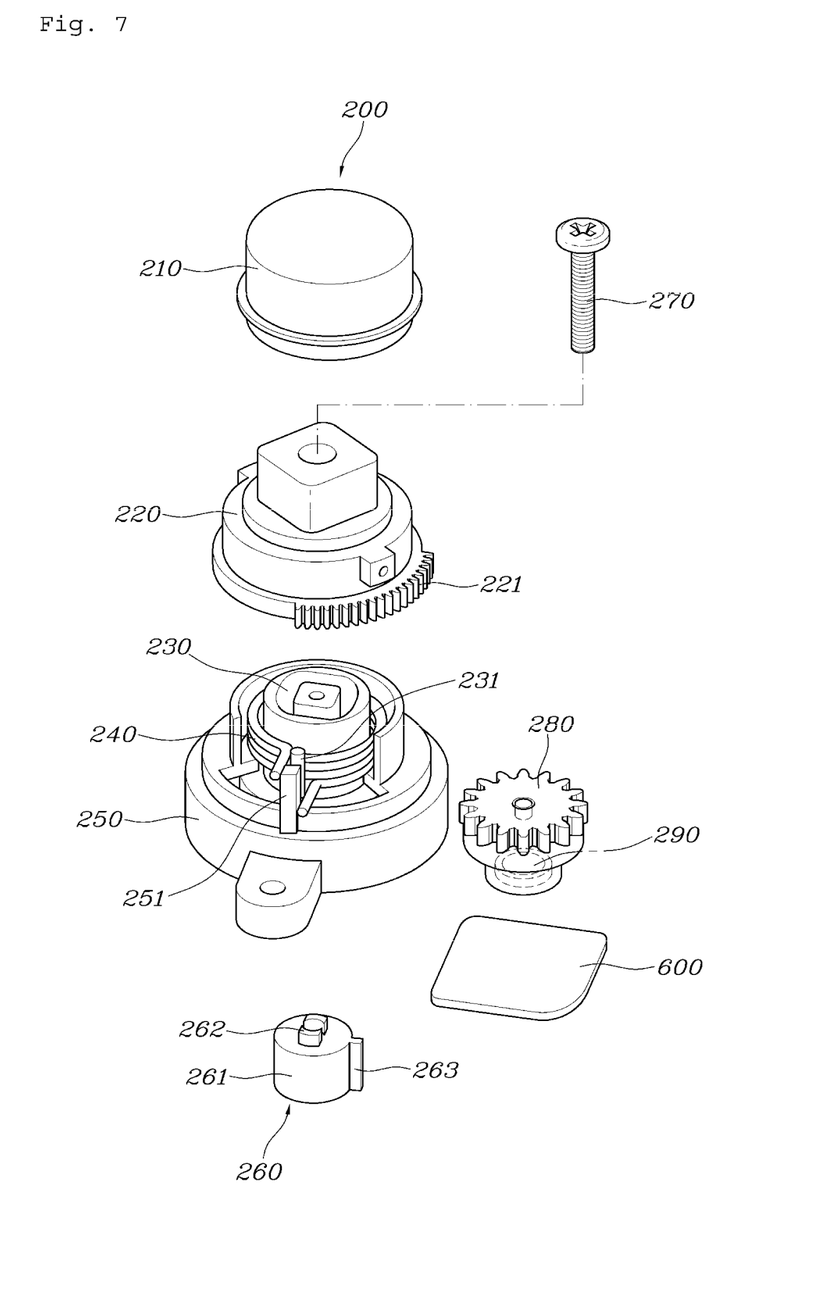
Figure 8:
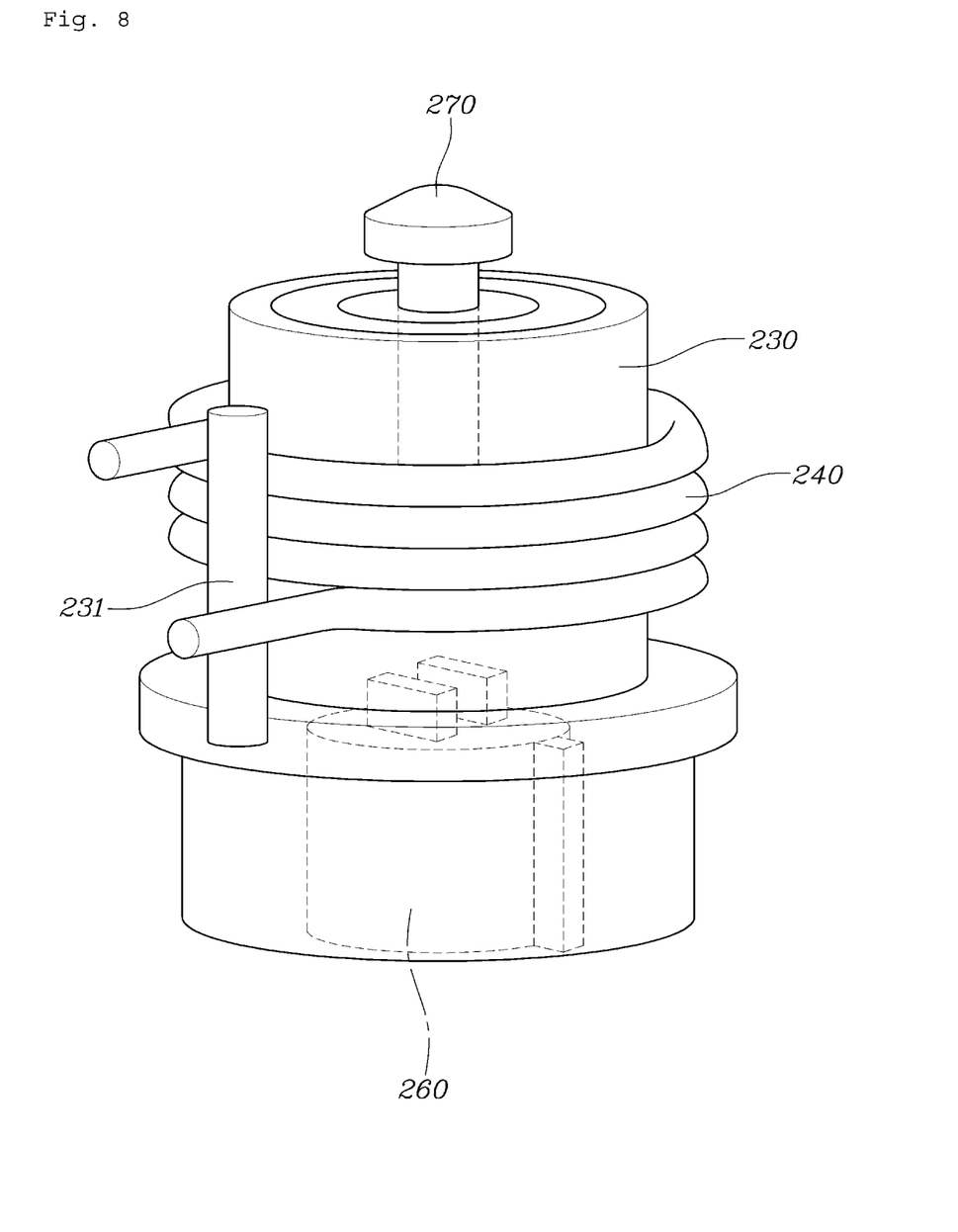

As illustrated in FIGS. 6 to 8, the steering dial switch 200 includes a steering knob 210, a base gear 220, a rotary member 230, the return spring 240, an outer case 250, the damper 260, a dial shaft 270, a sensing gear 280, and a permanent magnet 290.

The steering knob 210 is a part which is turned and manipulated by the user, the steering knob 210 and the base gear 220 are coupled to each other so as to be integrally turned, and the base gear 220 includes a gear part 221 formed along the circumferential direction thereof.

The outer case 250 is fixedly coupled to the core bracket 130 constituting the housing 100, and the rotary member 230 is rotatably received in the outer case 250.

A spring operation protrusion 231 and a stopper protrusion 251 protrude from the rotary member 230 and the outer case 250 in the same direction, respectively.

The return spring 240 is installed to be wound around the outer circumferential surface of the rotary member 230, opposite ends of the return spring 240 are supported by the outer surface of the stopper protrusion 251, and the spring operation protrusion 231 is positioned between the opposite ends of the return spring 240.

The damper 260 is referred to as a micro damper and includes an outer fixed body 261 and an inner rotary body 262, and a space between the outer fixed body 261 and the inner rotary body 262 is filled with silicone oil, so that a damping force can be exhibited.

The damper 260 is configured to be positioned inside the rotary member 230, the outer fixed body 261 of the damper 260 is coupled to the core bracket 130, and, as a key 263 protrudes outwards from the outer fixed body 261 and a key groove is formed on the core bracket 130, the key 263 is inserted into the key groove to enable the outer fixed body 261 of the damper 260 to be fixedly coupled to the core bracket 130.

The dial shaft 270 extends through the central portions of the base gear 220 and the rotary member 230 to be coupled to the inner rotary body 262 of the damper 260, and after the coupling of the dial shaft 270, the steering knob 210 is coupled to the base gear 220 so as to prevent the dial shaft 270 from being exposed.

The sensing gear 280 is engaged with the gear part 221 of the base gear 220 in an external gear form, and the permanent magnet 290 is coupled to the rotation central portion of the sensing gear 280 while facing a printed circuit board (PCB) 600.

According to the present disclosure, the damper 260 is installed to be positioned inside the steering dial switch 200, so that the steering dial switch 200 can have a reduced external size, thereby having a compact configuration.

In addition, the present disclosure has a configuration capable of operating the damper 260 by means of a binding force of the dial shaft 270, and this configuration is advantageous in that the absence of a gear structure can reduce a cost of a precision mold. In particular, when the damper 260 is rotated, the occurrence of pulsation noise due to a gear structure can be prevented.

The damper 260 serves to prevent noise and impact by slowing the speed of restoration due to the spring force of the return spring 240.

When the user turns the steering dial switch 200 clockwise or counterclockwise, the permanent magnet 290 is rotated by the rotation of the sensing gear 280, and the PCB 600 recognizes the rotation of the steering dial switch 200 through a change in magnetic flux, which depends on the rotation of the permanent magnet 290, so as to generate a signal related to steering.

In addition, when the user turns the steering dial switch 200 clockwise or counterclockwise, the return spring 240 is compressed to accumulate an elastic force, and, when the user releases the manipulating force applied to the steering dial switch 200, the steering dial switch 200 is rotated in an opposite direction by means of the spring force of the return spring 240 so as to return to its initial position.

The steering dial switch 200 may additionally include a power handle, and an upper surface of the power handle may be installed to be exposed to the outside of the steering dial switch 200.

The upper surface of the power handle is formed to be concave so as to enable the user to place a finger thereon, and, when the user applies a small rotational force to the upper surface of the power handle while placing an index finger or a thumb of the user's left hand thereon, the entire steering dial switch 200 can be rotated with respect to the housing 100.

Figure 9:
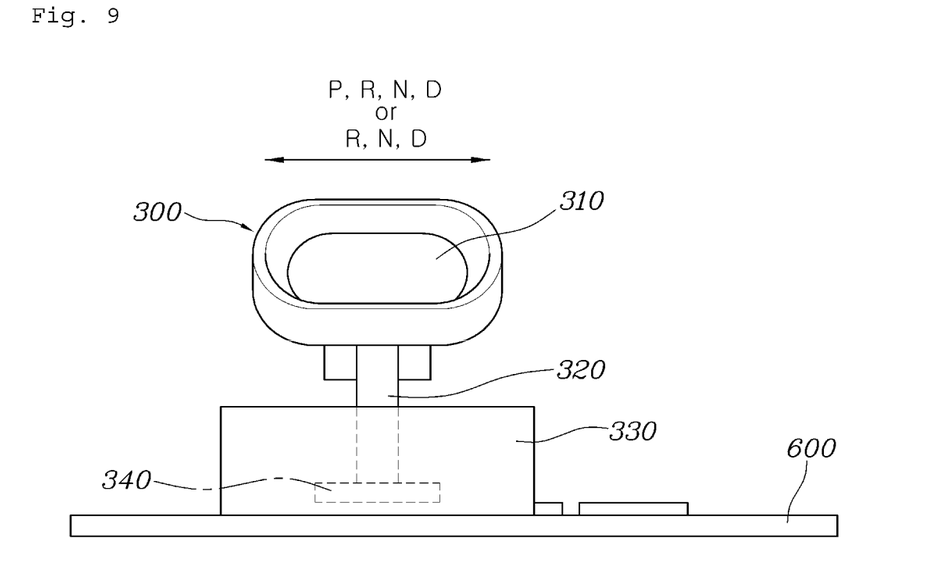
FIG. 9 is a drawing for describing a gear-shifting slide switch in one form of the present disclosure.

The gear-shifting slide switch 300 is disposed on the top surface of the switch part 120, and the user can manipulate the gear-shifting slide switch by placing the index finger or thumb of the user's left hand, namely the other hand which does not hold the holding part, in contact with a surface of the gear-shifting slide switch, and pushing forwards or pulling backwards the same with the finger.

When the gear-shifting slide switch 300 is manipulated, it may be configured that one of four shifting gears (P gear, R gear, N gear, and D gear) can be executed, or may be configured that one of three shifting gears (R gear, N gear, and D gear) can be executed.

If one of the three shifting gears (R gear, N gear, and D gear) is executed when the gear-shifting slide switch 300 is manipulated, the gear-shifting slide switch 300 can have a reduced moving distance, thereby having a reduced size.

If one of the three shifting gears (R gear, N gear, and D gear) is executed when the gear-shifting slide switch 300 is manipulated, a menu for shifting to the P gear may be additionally configured on the fixed display device 20, whereby the occurrence of accidents can be reduced because, in case of emergency, any one of passengers in the autonomous vehicle can manipulate the P gear even if the passengers are not a vehicle operator.

In addition, if one of the three shifting gears (R gear, N gear, and D gear) is executed when the gear-shifting slide switch 300 is manipulated, it may be configured that the gear-shifting slide switch 300 is shifted to the N gear and then the brake button switch 500 is manipulated for more than a predetermined time, so that the P gear is executed.

That is, after the gear-shifting slide switch 300 is shifted to the N gear, the vehicle is turned off so as to create an N-gear parking situation, and if the brake button switch 500 is manipulated for more than 3 seconds in the N-gear situation, the vehicle is shifted to the P gear so as to be finally in a P-gear parking situation.

The gear-shifting slide switch 300 is installed to be positioned on the top surface of the switch part 120, and the user manipulates the gear-shifting slide switch 300 by pushing forwards or pulling backwards the same with the index finger or thumb of the user's left hand while holding the holding part 110 with the user's right hand.

A knob 310 of the gear-shifting slide switch 300 is integrally coupled to a rod 320, the rod 320 is configured to linearly reciprocate with respect to a switch body 330, and a permanent magnet 340 is coupled to the rod 320 so as to be installed while facing the PCB 600.

In addition, the switch body 330 has a groove structure therein, so that the rod 320 can be fixedly positioned therein when the knob 310 is manipulated, and, in particular, a spring disposed in the switch body 330 can generate a manipulating force.

If the user pushes forwards or pulls backwards the knob 310 of the gear-shifting slide switch 300 with the index finger or thumb of the user's left hand while holding the holding part 110 of the housing 100 with the user's right hand, a position of the permanent magnet 340 is changed due to movement of the rod 320, and the PCB 600 recognizes the movement of the gear-shifting slide switch 300 through a change in magnetic flux, which depends on a change in the position of the permanent magnet 340, so as to generate a signal related to gear-shifting.

Figure 10:
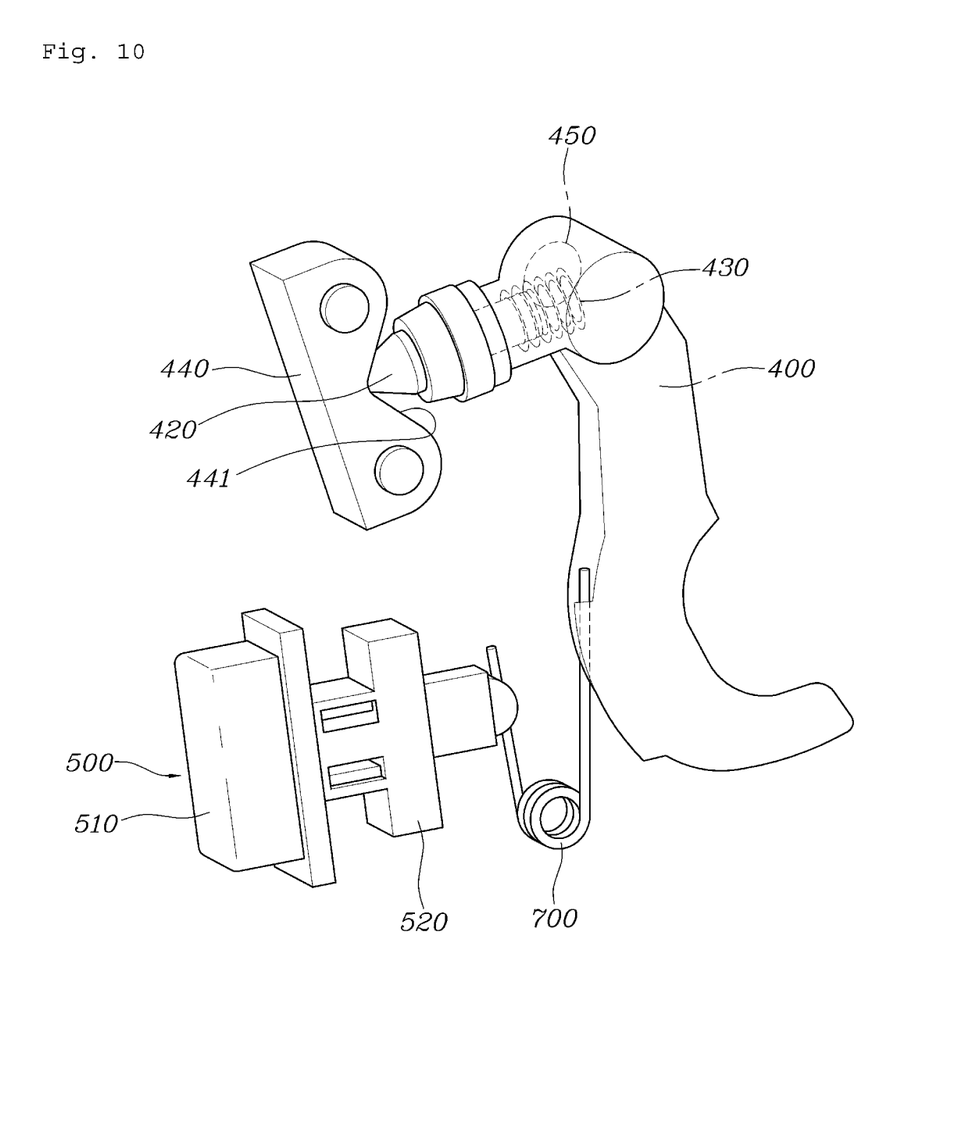
FIG. 10 and FIG. 11 are drawings for describing an acceleration rotary switch and a brake button switch in one form of the present disclosure.
Figure 11:
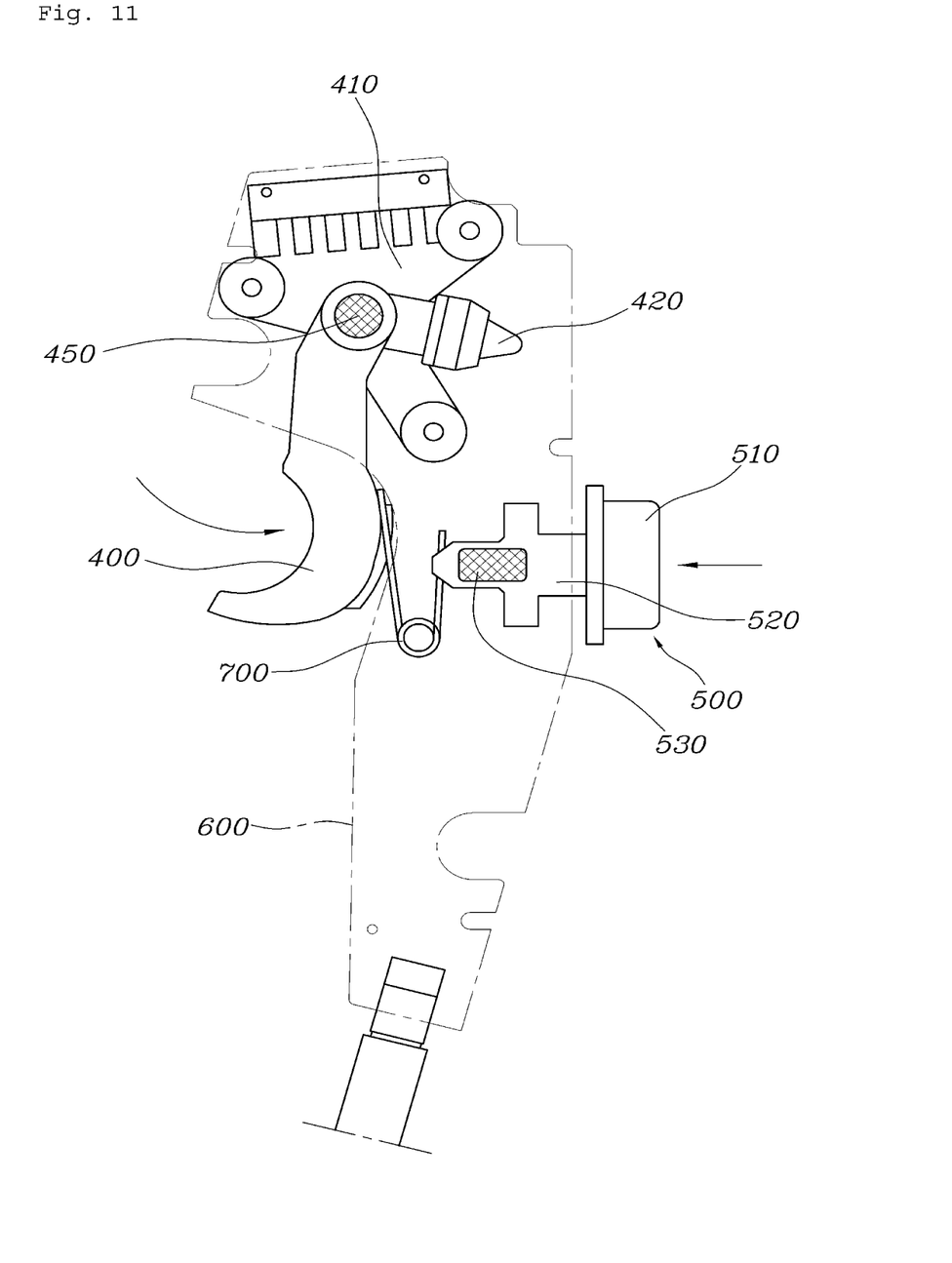

The acceleration rotary switch 400 is disposed at a position closest to the holding part 110 in the switch part 120, and the user can manipulate the acceleration rotary switch with an index finger of the user's right hand, namely the hand which is holding the holding part 110.

After the user holds the holding part 110 with the user's right hand like a pistol, the user can manipulate the acceleration rotary switch by pulling backwards the same with the index finger of the user's right hand as if pulling a trigger in a state where the index finger of the user's right hand has been inserted into a hole of the housing 100 in a leftward/rightward direction.

A housing hole 140 is formed through the housing 100 so as to enable the index finger of the user's right hand holding the housing 100, to be inserted thereinto in a leftward/rightward direction.

An upper portion of the acceleration rotary switch 400 is coupled to the core bracket 130 constituting the housing 100 to be rotatable in a forward-and-backward direction, and a lower portion of the acceleration rotary switch is manipulated by the index finger of the user's right hand.

An acceleration fixing bracket 410 is used to fix a position of the upper portion of the acceleration rotary switch 400, which is the center of rotation, and the acceleration fixing bracket 410 is fixedly coupled to the core bracket 130 while covering the upper portion of the acceleration rotary switch 400, which is the center of rotation.

In order to provide a feeling of manipulation and a restorative force of the acceleration rotary switch 400, a bullet 420 is installed in the upper portion of the acceleration rotary switch 400 so as to be elastically supported by the medium of a bullet spring 430, and a groove member 440 is fixedly installed in the core bracket 130 constituting the housing 100, the groove member including a wavy groove 441 which is formed thereon and is in contact with the bullet 420.

A permanent magnet 450 is coupled to the rotation central portion of the acceleration rotary switch 400 while facing the PCB 600, and, if the user pulls the acceleration rotary switch 400 with the index finger of the user's right hand while holding the holding part 110 of the housing 100 with the user's right hand, the permanent magnet 450 is rotated, and the PCB 600 recognizes the rotation of the acceleration rotary switch 400 through a change in magnetic flux, which depends on the rotation of the permanent magnet 450, so as to generate a signal related to acceleration.

When the user is holding the holding part 110 with the user's one hand, the brake button switch 500 is disposed on the rear surface of the housing 100, and the user can manipulate the brake button switch by pressing the same with a finger of the user's hand which is holding the holding part 110.

That is, after the user holds the holding part 110 with the user's right hand like a pistol, the user can manipulate the acceleration rotary switch 400 with the index finger of the user's right hand, and manipulate the brake button switch 500 disposed on the rear surface of the housing 100 by pressing the same with a thumb of the user's right hand.

The brake button switch 500 is configured to include a knob 510 manipulated by the user and a slider 520 coupled to the knob 510 to integrally move with the same, the knob 510 is installed to be exposed to the outside through the rear surface of the housing 100, and the slider 520 is installed in the core bracket 130 constituting the housing 100 so as to slide in a forward-and-backward direction.

A permanent magnet 530 is coupled to the slider 520 while facing the PCB 600, and, if the user holds the holding part 110 of the housing 100 with the user's right hand and presses the brake button switch 500 with the thumb of the user's right hand, a position of the permanent magnet 530 is changed, and the PCB 600 recognizes the movement of the brake button switch 400 through a change in magnetic flux, which depends on a change in the position of the permanent magnet 530, so as to generate a signal related to braking.

A brake fixing bracket 540 is used to prevent separation of the brake button switch 500, and the brake fixing bracket 540 is fixedly coupled to the core bracket 130 while covering one side of the slider 520 to which the permanent magnet 530 is coupled.

According to the present disclosure, the center of a connection spring 700 is fixedly installed in the core bracket 130 constituting the housing 100, one end of the connection spring 700 is installed to be in contact with a lower end of the acceleration rotary switch 400, and the other end of the connection spring 700 is installed to be in contact with the tip of the slider 520 constituting the brake button switch 500.

When the acceleration rotary switch 400 and the brake button switch 500 are manipulated, the connection spring 700 serves to provide a restorative force.

The acceleration rotary switch 400 is configured to receive a restorative force of a double spring structure obtained by the bullet spring 430 and the connection spring 700, and, even though one of the two springs is broken or damaged, the remaining spring can perform its function.

The bullet spring 430 and the connection spring 700 are configured to have different spring forces, and, when the acceleration rotary switch 400 or the brake button switch 500 are operated, erroneous manipulations can be prevented through a difference between the two different spring forces.

In addition, when the user simultaneously manipulates the acceleration rotary switch 400 and the brake button switch 500, the spring force of the connection spring 700 rapidly increases, so that the user can recognize, through the rapidly increasing spring force of the connection spring 700, a situation where the two switches are simultaneously manipulated, so as to prevent erroneous manipulations.

If the user simultaneously manipulates the acceleration rotary switch 400 and the brake button switch 500, the PCB 600 recognizes and processes a signal of the brake button switch 500 as a priority, so as to prevent the occurrence of accidents due to erroneous manipulations and sudden acceleration.

According to the present disclosure, the steering dial switch 200, the gear-shifting slide switch 300, the acceleration rotary switch 400, and the brake button switch 500 are manipulated in different types, whereby intuition during manipulation can be improved and the improved intuition can prevent erroneous manipulations.

As described above, an integrated control apparatus for an autonomous vehicle according to the present disclosure includes: a movable control device 10 corresponding to a portable device that performs steering, gear-shifting, acceleration, and braking of a vehicle by a user's manipulation when a driving mode is shifted from an autonomous driving mode to a manual driving mode; and a fixed display device 20 manipulated in a touch manner to perform other functions of the vehicle. This configuration is advantageous in that manipulation is easy and convenient. In particular, various vehicle control functions are separately assigned to the movable control device 10 and the touch-type display device 20, thereby preventing erroneous manipulations to the largest extent.

In addition, the movable control device 10 is a portable device that the user can hold and move to a desired position with the user's hand, and has an advantage of being easily manipulated due to its small volume and light weight.

The steering dial switch 200, the gear-shifting slide switch 300, the acceleration rotary switch 400, and the brake button switch 500 which are disposed in the movable control device 10 are configured to be manipulated in different types, thereby preventing erroneous manipulations to the largest extent.

Although the present disclosure has been described and illustrated in conjunction with particular embodiments thereof, it will be apparent to those skilled in the art that various improvements and modifications may be made to the present disclosure without departing from the technical idea of the present disclosure defined by the appended claims.

What is claimed is:

1. An integrated control apparatus for an autonomous vehiclecomprising:
   a movable control device configured to steer, gear-shift, accelerate and brake,
   wherein the movable control device comprises:
      a housing,
      a steering dial switch, a gear-shifting slide switch, an acceleration rotary switch, and a brake button switch which are disposed in the housing.

2. The integrated control apparatus for an autonomous vehicle of claim 1, further comprising:
   a fixed display device separated from the movable control device and configured to control functions other than steering, gear-shifting, acceleration, and braking, wherein the fixed display device is a touch screen.

3. The integrated control apparatus for an autonomous vehicle of claim 1, wherein:
   the movable control device is a portable device, and
   the fixed display device is fixedly installed in an indoor space of the autonomous vehicle.

4. The integrated control apparatus for an autonomous vehicle of claim 2, wherein the fixed display device is configured to:
   control the functions including driving lamps mounted on front and rear sides of a vehicle, making a warning sound, and switching a driving mode.

5. The integrated control apparatus for an autonomous vehicle of claim 1, wherein:
   the movable control device is connected to the autonomous vehicle by a spring wire, and
   opposite ends of the spring wire are connected to the movable control device and the autonomous vehicle in a separable connector structure.

6. The integrated control apparatus for an autonomous vehicle of claim 1, wherein the housing comprises:
   a holding part; and
   a switch part extending along a longitudinal direction of the holding part, and including the steering dial switch, the gear-shifting slide switch, the acceleration rotary switch, and the brake button switch.

7. The integrated control apparatus for an autonomous vehicle of claim 6, wherein, when a user holds the holding part, the steering dial switch is disposed on an upper end of a rear surface of the housing and is turned clockwise or counterclockwise.

8. The integrated control apparatus for an autonomous vehicle of claim 1, wherein the steering dial switch is configured to:
   move clockwise or counterclockwise with respect to the housing; and
   move in an opposite direction by a spring force of a return spring to return to an initial position.

9. The integrated control apparatus for an autonomous vehicle of claim 8, wherein the steering dial switch comprises:
   a damper configured to slow the spring force of the return spring, wherein the damper is concentrically installed inside the steering dial switch.

10. The integrated control apparatus for an autonomous vehicle of claim 6, wherein:
    the gear-shifting slide switch is disposed on an upper surface of the switch part, and
    the gear-shifting slide switch is controlled by a finger of a user.

11. The integrated control apparatus for an autonomous vehicle of claim 2, wherein the gear-shifting slide switch is controlled by one of four shifting gears (P gear, R gear, N gear, and D gear), or one of three shifting gears (R gear, N gear, and D gear).

12. The integrated control apparatus for an autonomous vehicle of claim 11, wherein, when the gear-shifting slide switch is controlled by one of the three shifting gears (R gear, N gear, and D gear), the fixed display device is configured to display a menu for shifting to the P gear.

13. The integrated control apparatus for an autonomous vehicle of claim 11, wherein, when the gear-shifting slide switch is controlled by one of the three shifting gears (R gear, N gear, and D gear), the P gear is activated by shifting the gear-shifting slide switch ito an N gear and controlling the brake button switch for a predetermined amount of time.

14. The integrated control apparatus for an autonomous vehicle of claim 6, wherein:
- the acceleration rotary switch is disposed at a position closest to the holding part in the switch part, and
- the acceleration rotary switch is controlled by inserting a finger of a user into a hole of the housing in a leftward/rightward direction and pulling the finger backward.

15. The integrated control apparatus for an autonomous vehicle of claim 1, further comprising:
- a bullet installed in the acceleration rotary switch to be elastically supported by a bullet spring; and
- a groove member fixedly installed in the housing, the groove member further including a wavy groove that is in contact with the bullet.

16. The integrated control apparatus for an autonomous vehicle of claim 6, wherein:
- the brake button switch is disposed on a rear surface of the housing, and the brake button switch is controlled by pressing the brake button switch with a finger of the user.

17. The integrated control apparatus for an autonomous vehicle of claim 1, wherein:
- the acceleration rotary switch and the brake button switch are installed to be connected to each other by a connection spring,
- the connection spring is configured to provide a restorative force to the acceleration rotary switch and the brake button switch, and
- a simultaneous control of the acceleration rotary switch and the brake button switch is alerted by a spring force of the connection spring.

18. The integrated control apparatus for an autonomous vehicle of claim 1, wherein the movable control device further comprises:
- permanent magnets coupled to the steering dial switch, the gear-shifting slide switch, the acceleration rotary switch, and the brake button switch, respectively; and
- a PCB fixedly installed in the housing while facing the permanent magnets,
- wherein the PCB is configured to generate at least one signal from a steering signal, a gear-shifting signal, an acceleration signal, or a braking signal through a change in magnetic flux of the permanent magnets.

19. The integrated control apparatus for an autonomous vehicle of claim 18, wherein the PCB is configured to:
- process the brake signal as a priority when the acceleration rotary switch and the brake button switch are simultaneously controlled.

20. The integrated control apparatus for an autonomous vehicle of claim 1, wherein the steering dial switch, the gear-shifting slide switch, the acceleration rotary switch, and the brake button switch are controlled differently.

\* \* \* \* \*